United States Patent
Ponec et al.

(10) Patent No.: US 11,153,417 B2
(45) Date of Patent: *Oct. 19, 2021

(54) HYBRID HTTP AND UDP CONTENT DELIVERY

(71) Applicant: Akamai Technologies, Inc., Cambridge, MA (US)

(72) Inventors: Miroslav Ponec, Prague (CZ); Andrew Alness, Santa Cruz, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,324

(22) Filed: Sep. 23, 2019

(65) Prior Publication Data

US 2020/0021672 A1    Jan. 16, 2020

Related U.S. Application Data

(63) Continuation of application No. 15/488,687, filed on Apr. 17, 2017, now Pat. No. 10,425,507, which is a
(Continued)

(51) Int. Cl.
*H04L 29/06* (2006.01)
*H04L 29/08* (2006.01)

(52) U.S. Cl.
CPC ...... *H04L 69/165* (2013.01); *H04L 29/06027* (2013.01); *H04L 67/02* (2013.01);
(Continued)

(58) Field of Classification Search
CPC ....... H04L 69/02; H04L 69/08; H04L 69/164; H04L 69/165; H04L 67/02; H04L 67/14;
(Continued)

(56) References Cited

U.S. PATENT DOCUMENTS

| 6,704,786 B1 * | 3/2004 | Gupta | H04L 69/16 709/227 |
| 8,117,322 B1 * | 2/2012 | McQuade | H04L 69/164 709/228 |

(Continued)

OTHER PUBLICATIONS

I. Cidon, R. Rom, A. Gupta and C. Schuba, "Hybrid TCP-UDP transport for Web traffic," 1999 IEEE International Performance, Computing and Communications Conference (Cat. No. 99CH36305), Scottsdale, AZ, USA, 1999, pp. 177-184, doi: 10.1109/PCCC.1999.749436. (Year: 1999).*

(Continued)

*Primary Examiner* — James N Fiorillo
(74) *Attorney, Agent, or Firm* — David H. Judson

(57) ABSTRACT

A hybrid HTTP/UDP delivery protocol provides significant improvements for delivery of video and other content over a network, such as an overlay. The approach is especially useful to address problems (e.g., slow startup times, rebuffering, and low bitrates) for HTTP-based streaming. In general, the protocol has two phases: an HTTP phase, and a UDP phase. In the HTTP phase, the client sends an HTTP GET request to a server. The GET request contains a transport header informing the server that the client would like to use UDP-based transfer over the protocol. The server may refuse this mode and continue in ordinary HTTP mode, or the server may respond by sending an empty response with header information informing the client how to make the connection to enter the UDP phase. In the UDP phase, the client initiates a connection and receives the originally-requested content over UDP.

16 Claims, 4 Drawing Sheets

Related U.S. Application Data continuation of application No. 13/974,087, filed on Aug. 23, 2013, now Pat. No. 9,628,542.

(60) Provisional application No. 61/692,950, filed on Aug. 14, 2012.

(52) U.S. Cl.
CPC .............. *H04L 67/14* (2013.01); *H04L 69/02* (2013.01); *H04L 69/08* (2013.01); *H04L 69/164* (2013.01)

(58) Field of Classification Search
CPC ... H04L 29/06027; H04L 69/14; H04L 69/18; H04L 69/24; H04L 12/66; H04L 12/181; H04L 41/0266; H04L 65/1066; H04W 76/00; H04M 7/00; G06F 9/54; G06F 16/95
USPC ................. 709/217, 219, 224, 228, 229, 230
See application file for complete search history.

(56) References Cited

U.S. PATENT DOCUMENTS

| | | | | |
|---|---|---|---|---|
| 8,849,988 B2* | 9/2014 | Mutnuru | ............. | H04L 43/0817 709/224 |
| 8,924,581 B1* | 12/2014 | Acharya | ............. | H04L 65/4084 709/231 |
| 2003/0154217 A1* | 8/2003 | Kinno | ................ | H04N 21/8405 |
| 2003/0188001 A1* | 10/2003 | Eisenberg | ............. | H04L 69/164 709/229 |
| 2005/0086501 A1* | 4/2005 | Woo | ........................ | G06F 21/10 713/189 |
| 2005/0165849 A1* | 7/2005 | Moradi | ............ | H04N 21/64322 |
| 2005/0216725 A1* | 9/2005 | Vaarala | ................ | H04L 63/029 713/151 |
| 2005/0262251 A1* | 11/2005 | Klemets | ............. | H04N 21/4384 709/230 |
| 2007/0162981 A1* | 7/2007 | Morioka | ............. | H04L 63/0428 726/30 |
| 2009/0077247 A1* | 3/2009 | Bouazizi | ............. | H04L 65/4076 709/229 |
| 2009/0234968 A1* | 9/2009 | Thomas | ............. | H04L 67/1029 709/241 |
| 2010/0088426 A1* | 4/2010 | Takemura | ........ | H04N 21/64322 709/231 |
| 2010/0279733 A1* | 11/2010 | Karsten | ................... | H04L 69/16 455/552.1 |
| 2010/0293385 A1* | 11/2010 | Nanda | ..................... | H04L 63/08 713/176 |
| 2011/0029681 A1* | 2/2011 | Lee | ......................... | H04L 69/08 709/230 |
| 2011/0202965 A1* | 8/2011 | Henry | ................. | H04L 65/4076 725/110 |
| 2012/0071141 A1* | 3/2012 | Nicoara | ............ | H04L 29/08639 455/414.1 |
| 2012/0144445 A1* | 6/2012 | Bonta | ................. | H04L 12/1868 725/116 |
| 2012/0324099 A1* | 12/2012 | Perez Martinez | ...... | H04W 4/18 709/224 |
| 2013/0007226 A1* | 1/2013 | White | ................ | H04N 21/4383 709/219 |
| 2013/0311670 A1* | 11/2013 | Tarbox | ............... | H04N 21/6125 709/231 |
| 2014/0013376 A1* | 1/2014 | Xu | .................... | H04N 21/26258 725/116 |
| 2014/0136680 A1* | 5/2014 | Joshi | ..................... | H04L 43/026 709/224 |
| 2015/0046568 A1* | 2/2015 | Mantin | ................. | H04L 65/605 709/219 |
| 2016/0036730 A1* | 2/2016 | Kutscher | ............. | H04L 41/083 370/401 |

OTHER PUBLICATIONS

Counterpart, EPO No. 13830989.3, Second Office Action dated Jan. 3, 2020, 7 pages.

* cited by examiner

HYBRID HTTP AND UDP CONTENT DELIVERY

BACKGROUND

Technical Field

This application relates generally to data communication over a network.

Brief Description of the Related Art

Distributed computer systems are well-known in the prior art. One such distributed computer system is a "content delivery network" or "CDN" that typically is operated and managed by a service provider. The service provider typically provides the content delivery service on behalf of third parties (customers) who use the service provider's shared infrastructure. A distributed system of this type is sometimes referred to as an "overlay network" and typically refers to a collection of autonomous computers linked by a network or networks, together with the software, systems, protocols and techniques designed to facilitate various services, such as content delivery, application acceleration, or other support of outsourced origin site infrastructure. A CDN service provider typically provides service delivery through digital properties (such as a website), which are provisioned in a customer portal and then deployed to the network.

Overlay networks of the type described provide HTTP-based streaming from a server in the network, to a client that receives a video stream and plays it back to a screen. Clients may be running on a desktop computer, mobile device (smart phones, tablets), set-top-boxes, smart televisions or appliances, or any other network-connected devices. For a typical HTTP-based streaming use case, the client resolves a name (e.g., a CDN hostname) through DNS to an IP address and makes a TCP connection to the server associated with that address. Once established, the client sends an HTTP GET request for the desired content, e.g., a media fragment. The server responds with the content data in a standard HTTP response body. The connection is kept open for further requests and responses.

Standard approaches using the Hypertext Transfer Protocol (HTTP) make a request over HTTP protocol (on top of a Transmission Control Protocol/Internet Protocol (TCP/IP) connection) and receive the response containing the requested data in the HTTP response (over the same TCP/IP connection). Alternative streaming approaches use a protocol on top of User Datagram Protocol (UDP) or TCP for both requests and responses (including control messages). Still other approaches tunnel some protocol through an HTTP session.

Today many end users experience problems with HTTP-based streaming, such as slow startup times, rebuffering, and low bitrates. Connectivity of these users often shows large enough bandwidth for high-quality video, but the round-trip times and packet loss characteristics between the server and the client negatively affect streaming performance, primarily because standard TCP-based implementations operate inefficiently on such networks.

There is thus a need to provide new techniques to improve video streaming quality. The disclosure herein addresses these and other problems associated with the relevant prior art.

BRIEF SUMMARY

A hybrid HTTP/UDP delivery protocol provides significant improvements for delivery of video and other content over a network, such as an overlay. The approach is especially useful to address problems (e.g., slow startup times, rebuffering, and low bitrates) for HTTP-based streaming.

In general, the protocol has two phases: an HTTP phase, and a UDP phase. In the HTTP phase, the client sends an HTTP GET request to a server. The GET request contains a transport header informing the server that the client would like to use UDP-based transfer over the protocol. The server may refuse this mode and continue in ordinary HTTP mode, or the server may respond by sending an empty response with header information informing the client how to make the connection to enter the UDP phase. In the UDP phase, the client initiates a connection and receives the originally-requested content over UDP.

The hybrid approach differs from conventional HTTP-based streaming by adding a separate channel for content transmission over a UDP protocol. Once a client connects to a server, the client sends an HTTP GET request for the desired content, e.g., a media fragment, and includes an HTTP header indicating that it wishes to use a UDP connection for the transfer of the body of the response. The client may also include any preferences about the UDP delivery (e.g., forward error correction (FEC), or other parameters). The server, if provisioned to use the protocol, responds with an empty body (Content-Length: 0) answer. The response preferably also includes various headers to prevent proxies on the way from caching the response. In the response headers, the client finds information on how to connect to the same server over UDP protocol (or also other extra alternate server references, e.g., for multi-source content acquisition). This information typically includes an IP address, a UDP port number, optionally some other special port number (to identify which flow the communication belongs to, because there may be many such connections on the same server's UDP port), version, and token T. Once this information is received from the server, the client initiates a UDP connection by sending a SYN UDP packet to the server based on the information provided in the HTTP response headers (IP address, UDP port number, other port number, etc.). This request preferably also includes a token T from the HTTP response. Using the token, the server thus can verify that the client sending the UDP packet saw the previous HTTP response and that such SYN packet should be processed. The SYN preferably also contains the client's Initial Sequence Number (ISN). The server responds with a SYN_ACK packet, which includes the acknowledged ISN value from the client's SYN packet. The SYN_ACK also contains the server's ISN value. The client then confirms the reception of the SYN_ACK with a SYN_ACK_ACK packet containing the acknowledged ISN of the server from the SYN_ACK packet that also includes the token T again. The confirmations of ISNs and token T serve as a measure to ensure both parties are participating in the communication and seeing all of the previous packets. The token (in the HTTP response, SYN and SYN_ACK_ACK packets) also facilitates reuse of the connection for other HTTP requests between this particular client and the server. Once the handshake is completed in this manner, the UDP-based connection is considered established; the server then starts sending data packets with (possibly FEC-encoded) content. The content is the same as would have been in the original HTTP response body if UDP is not used.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
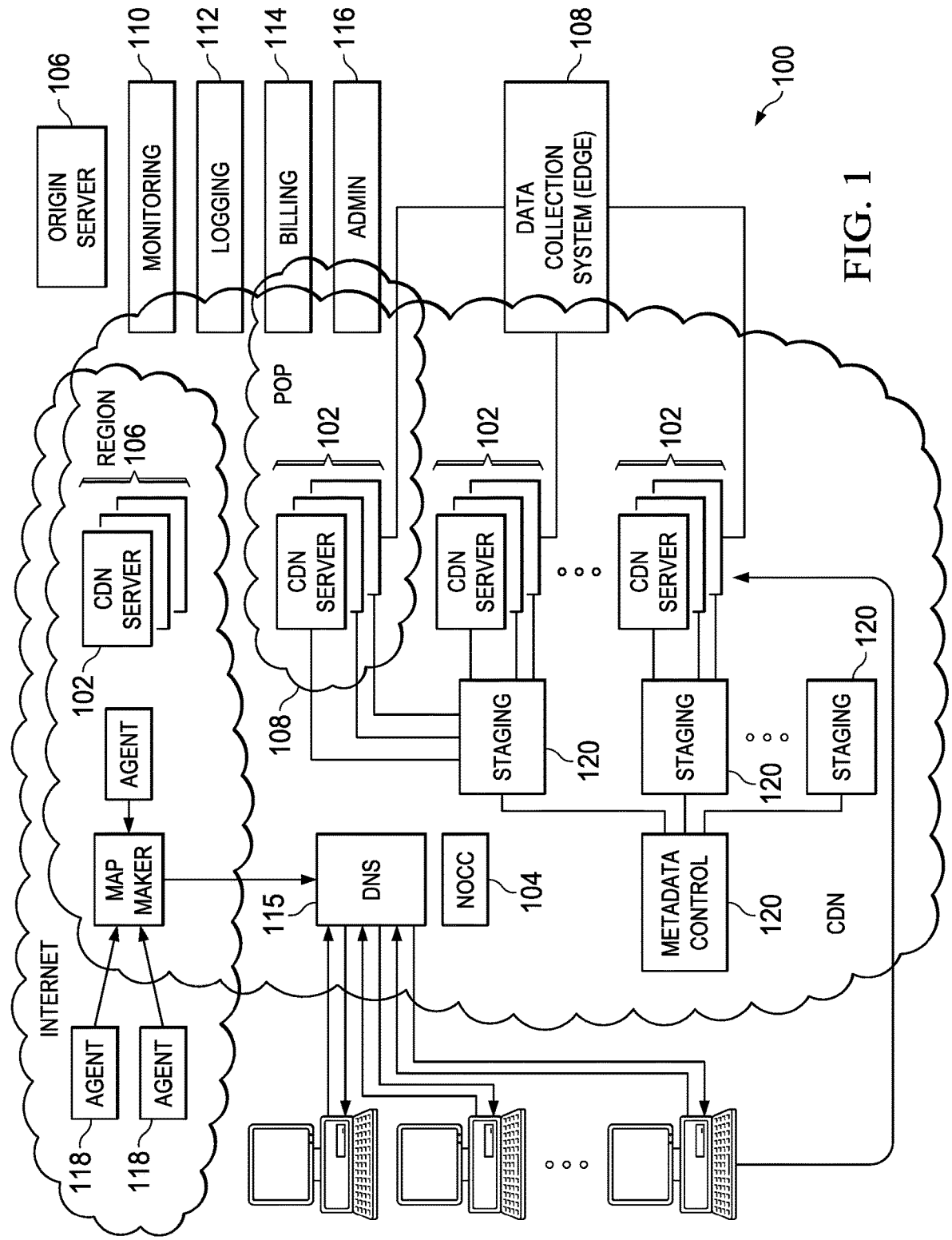
FIG. 1 is a block diagram illustrating a known distributed computer system configured as a content delivery network (CDN)

FIG. 1 illustrates a known distributed computer system that (as described below) is extended by the techniques herein.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
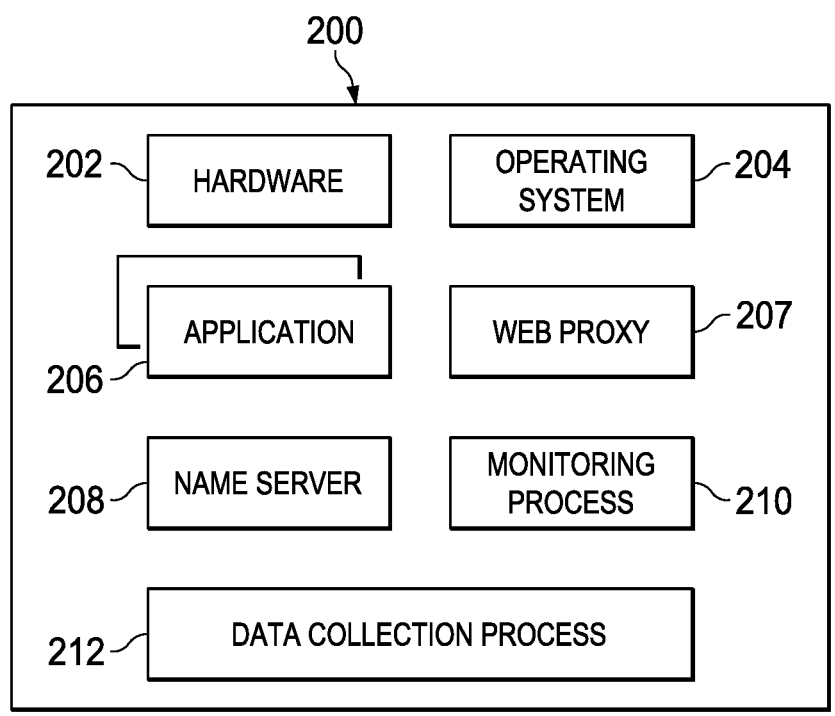
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP (web) proxy 207, a name server 208, a local monitoring process 210, and distributed data collection process 212. More generally, the proxy 207 is software, comprising program instructions, which instructions are held in memory and executed by a processor (or multiple processors) as needed.

For streaming media, the CDN machine typically includes one or more media servers, such as a Windows Media Server (WMS) or Flash server, as required by the supported media formats. An alternative to using dedicated media servers uses HTTP as the transport protocol. Architectures for HTTP-based live stream and VOD-based delivery are described in U.S. Publication No. 20110173345. That approach is implemented within a CDN and includes the high level functions of recording the content stream to be delivered using a recording tier, and playing the stream using a player tier. The step of recording the stream includes a set of sub-steps that begins when the stream is received at a CDN entry point in a source format. The stream is then converted into an intermediate format (IF), which is an internal format for delivering the stream within the CDN and comprises a stream manifest, a set of one or more fragment indexes (FI), and a set of IF fragments. The player process begins when a requesting client is associated with a CDN HTTP proxy, such as the ghost-based proxy. In response to receipt at the HTTP proxy of a request for the stream or a portion thereof, the HTTP proxy retrieves (either from the archive or the data store) the stream manifest and at least one fragment index. Using the fragment index, the IF fragments are retrieved to the HTTP proxy, converted to a target format, and then served in response to the client request. The source format may be the same or different from the target format. Preferably, all fragments are accessed, cached and served by the HTTP proxy via HTTP. In another embodiment, a method of delivering a stream on-demand (VOD) uses a translation tier (in lieu of the recording tier) to manage the creation and/or handling of the IF components.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

An overlay network web proxy (such as proxy 207 in FIG. 2) that is metadata-configurable is sometimes referred to herein as a global host or GHost process.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

The CDN may also provide client-side software to facilitate various content delivery functions, such as HD streaming. In one approach, the client comprises two components. The first is a non-persistent, in-browser media player that may be based upon third party (e.g., Adobe Flash or Microsoft Silverlight) components to facilitate adaptive or dynamic bitrate delivery of HD content. The second is an interface in the form of a persistent daemon that can perform "client-side" content delivery. Client-side delivery means downloading content both from CDN edge servers and from other end users who are running the interface and have previously downloaded the same content.

For a typical HTTP-based streaming use case, the client resolves a name (e.g., domain name, hostname, etc.) through DNS to an IP address and makes a TCP connection to the server associated with that address. Once established, the client sends an HTTP GET request for the desired content, e.g., a media fragment. The server responds with the content data in a standard HTTP response body. The connection is kept open for further requests and responses.

With the above as background, the subject matter of this disclosure is now described.

Hybrid HTTP+UDP Approach to Streaming and Downloads

This disclosure is a new approach to delivering media and other content over the Internet and replaces or complements standard HTTP-based delivery. The main difference compared to existing standard streaming and downloads approaches is the combination of HTTP-based request and UDP-based response.

Figure 3:
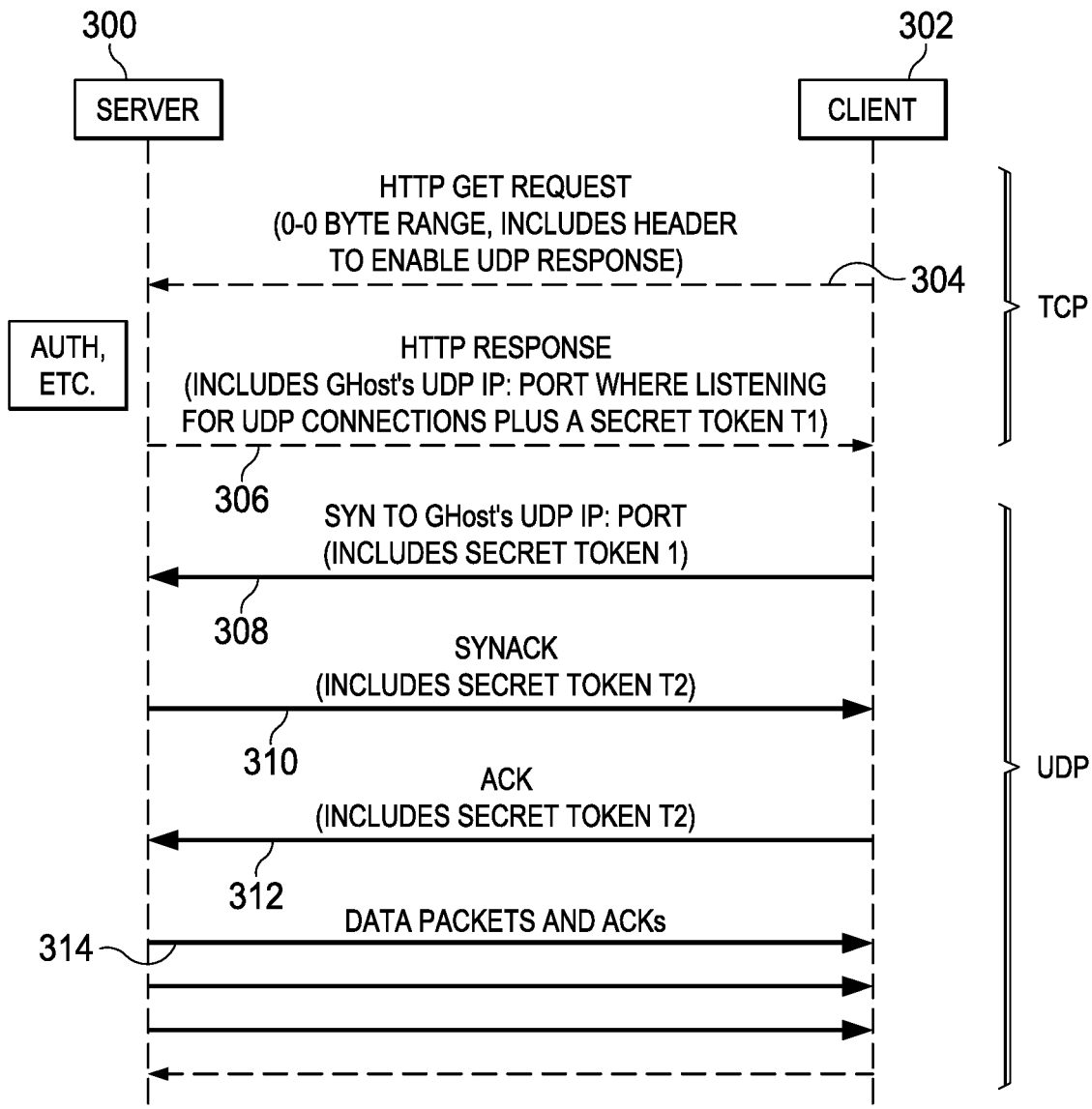
FIG. 3 is a diagram illustrating the basic hybrid HTTP/UDP data delivery approach of this disclosure.

FIG. 3 is a diagram illustrating the basic approach of this disclosure. As used in this drawing, server 300 refers to the server-side of the communication, and the client 302 refers to the client-side. The server and client components have been configured to execute the HTTP request-UDP response functionality of this disclosure. In this example scenario, the client 302 makes HTTP GET requests (one of which is shown at 304) for given byte ranges of the content of interest, e.g., fragments of a video, software download, or other content. Each HTTP request includes a HTTP header (or an equivalent out-of-band data structure) that instructs the server code that the client is enabled to receive a UDP response. As illustrated, at step 306 the server 300 responds to the HTTP GET request with an HTTP response that includes HTTP headers and a body. This response, however, differs from a conventional HTTP response in several respects. In particular, the HTTP response headers include an identification of an UDP IP:port where the server listens for UDP connections, and, optionally, a data string such as a secret token T1. The HTTP response body, however, is empty (i.e., it is devoid of (does not include) the content requested by the HTTP GET request). The first two communications occur via TCP. According to this disclosure, the content that would have been included in the HTTP body is then delivered over UDP by the subsequent UDP-based connection illustrated. In particular, at step 308 the client, having received the HTTP response, issues a SYN to the server's UDP IP:port as identified in the HTTP response. The SYN may include the secret token T1 (for security purposes). At step 310 the server returns to the client a SYNACK that includes a secret token T2. At step 312 the client responds with an ACK that includes the secret token T2. The tokens ensure that only the client receiving the original HTTP response can receive the original content that was requested. At step 314 the server then responds with the requested data packets, delivered over UDP.

Preferably, the HTTP connection is kept-alive (maintained persistently) to receive one or more additional HTTP requests (typically for additional byte ranges of the same or different content), with the requested content being delivered over UDP in this manner.

An optional improvement is to use forward error correction (FEC) or other encoding of packets (for the UDP delivery).

Figure 4:
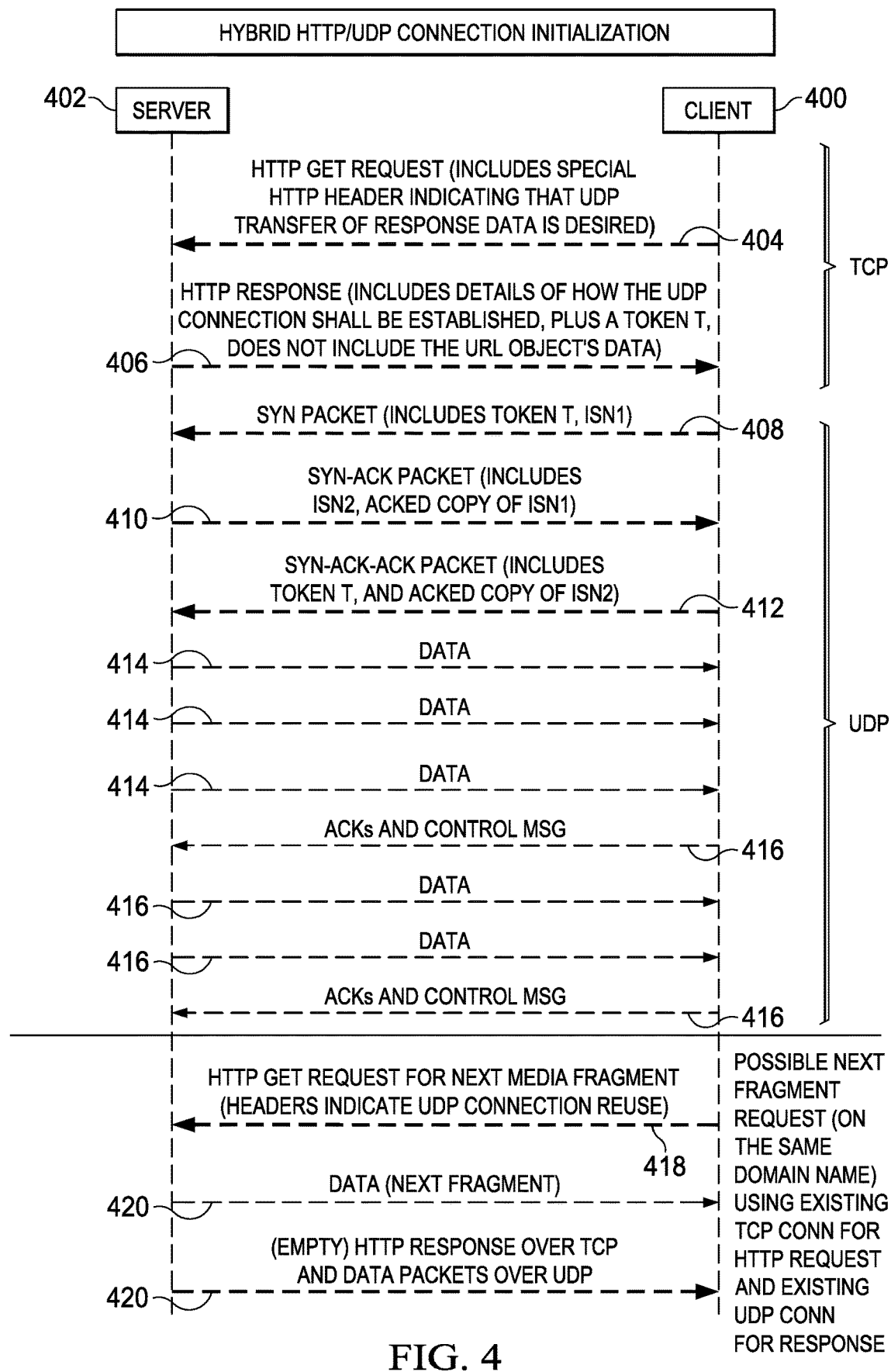
FIG. 4 is a diagram illustrating the operating scenario for the hybrid HTTP/UDP delivery technique of this disclosure in additional detail.

The following provides additional details of a preferred embodiment of the hybrid HTTP/UDP protocol. FIG. 4 illustrates this hybrid HTTP/UDP connection initialization and use scenario. As noted above, the hybrid approach differs by adding a separate channel for content transmission over a UDP protocol. In the approach herein, the client 400 resolves a name through DNS (e.g., an overlay network authoritative DNS) to an IP address and makes a TCP connection to an edge server 402 in that network. Once established, at step 404 the client sends an HTTP GET request for the desired content, e.g., a media fragment, and includes an HTTP header (or the like) indicating that it wishes to use a UDP connection for the transfer of the body of the response. The client may also include any preferences about the UDP delivery (e.g., forward error correction (FEC) or other parameters), but typically it is up to the server to decide whether to follow them. The server, assuming metadata processing for the object enabled usage of the UDP protocol, responds at step 406 with an empty body (Content-Length: 0) answer. The response preferably also includes various headers to prevent proxies on the way from caching the response. In the response headers, the client finds information on how to connect to the same server over UDP protocol (or also other extra alternate server references, e.g., for multi-source content acquisition). This information typically includes an IP address (because, for example, the connection so far may have been through an explicit proxy connection and the client may not have visibility into the server IP address it is communicating with). The returned information also includes a UDP port number, optionally some other special port number (to identify which flow the communication belongs to, because there may be many such connections on the same server's UDP port), version, and token T as described above.

Once this information is received from the server 402, the client 400 initiates the UDP connection at step 408 by sending a SYN UDP packet to the server based on the information provided in the HTTP response headers (IP address, UDP port number, other port number, etc.). This request preferably also includes a token T from the HTTP response. Using the token, the server thus can verify that the client sending the UDP packet saw the previous HTTP response and that such SYN packet should be processed (all unexpected packets received by the server are otherwise dropped silently without any response to the sender). As illustrated, preferably the SYN also contains the client's Initial Sequence Number (ISN1). At step 410, the server 402 responds with a SYN_ACK packet, which includes the acknowledged ISN1 value from the client's SYN packet. The SYN_ACK also contains the server's ISN value, ISN2. At step 412, the client then confirms the reception of the SYN_ACK with a SYN_ACK_ACK packet containing the acknowledged ISN of the server (i.e., ISN2) from the SYN_ACK packet that also includes the token T again. The confirmations of ISNs and token T serve as a measure to ensure both parties are participating in the communication and seeing all of the previous packets. The token (in the HTTP response, SYN and SYN_ACK_ACK packets) facilitates reuse of the connection for other HTTP requests between this particular client and the server instance. Once the handshake is completed in this manner, the UDP-based connection is considered established; thus, at step 414, the server then starts sending data packets with (possibly FEC-encoded) content. The content is the same as would have been in the original HTTP response body if UDP is not used. Preferably, the server keeps sending data packets and client replies with acknowledgements (ACK). ACKs may be used to facilitate congestion control. During the handshake and data delivery, the client may also send (e.g., at step 416) some control messages similarly to TCP, such as RST packets. The client also sends special packets to control the flow of the encoded data sent by the server, in the event FEC is used, e.g., indicating that a current FEC block was successfully decoded and the next block should be sent by the server.

As further indicated in FIG. 4, after the initial connection establishment and exchange, the client 400 may request a next piece of content. To that end, at step 418 the client 400 issues a GET request (e.g., on the same domain name) for the next fragment. The request may be sent using the existing TCP connection for the HTTP request, with the existing UDP connection being used for the response. The response is delivered from the server 402 at step 420. This completes the description of the example scenario.

Typically, the protocol connection over UDP only supports one session at a time (similarly to HTTP over TCP). While the approach does not provide explicit multiplexing per connection, many connections may work over the same UDP port; thus, from the operating system's perspective, the multiple-connection scenario has the appearance of multiplexing. Thus, in one embodiment, multiple UDP ports (one per stack) can be used on a single server to better utilize available CPU processing resources.

Preferably, both the TCP connection (for HTTP) and UDP connections are kept alive after satisfying a request. Then, when another URL object has to be downloaded (e.g., the next media fragment in a stream), both the connections are (or can be) reused if they are still considered alive (through timeouts). Preferably, the TCP and UDP connections are not coupled or bound in any way other than for each single HTTP GET request, each can be closed without affecting the other one, and each can be reused independently for further requests. A new HTTP GET request is sent over the TCP connection, indicating via HTTP headers that an existing UDP connection shall be reused, and the server immediately responds by both sending the HTTP (empty) response over TCP and by sending the body of the requested object over the existing UDP connection.

Before processing the new UDP packets for the new fragment, the client typically must get the complete HTTP response first, as (when FEC-encoded data is used) it contains all the details necessary to decode the FEC-encoded data coming over the protocol. It is also possible to send a new HTTP GET request (and request reuse of the existing connection for the data transfer) before the current data transfer completes. This leads to ceasing existing transfer, and the new request is satisfied right away. There is no extra confirmation from each side needed for this because every data packet conforming to this protocol contains an ID of the HTTP response which it "belongs to"; thus, the data packets belonging to the new HTTP request are easily identified by the client.

Preferably, protocol-specific information is exchanged between server and client through transport HTTP header values that conform to the requirements of HTTP/1.1. A special user-agent (UA) string may also be included in a client HTTP request (from a client that is enabled to implement the protocol). As noted above, if the protocol is to be used, the HTTP response from the server contains an empty body and has the additional transport header with details on how to make (or reuse) the connection. More specifically, the server parses the transport header and responds to the request by sending one of the following: an HTTP response with an HTTP status code 202 in case the hybrid protocol is to be used (and the header contains the connection endpoint and token details), an HTTP response with a status code 202 in case the protocol is to be used (and the header above does not contain the endpoint and token keys meaning that an existing protocol connection is to be reused, as requested by the client in the request header), or an HTTP response with any status code that it would use if the protocol is not to be used, i.e., the server will behave according to the HTTP specification and the response contains the resource data in the body as if no transport header identifying the protocol is present. In both the 202 response code cases, the response is uncacheable by proxy servers, while the third one is cacheable (as controlled by the usual server metadata settings). Anti-caching headers that are imposed by the server (in the HTTP 202 response) include, for example, Pragma: no-cache, Cache-Control: private, must-revalidate, Date, Expires, Cache-Control: no-store, no-cache, max-age=0, and Vary: "*".

The token is optional. It may be a 128-bit unsigned integer represented as 32 upper-case hexadecimal digits. The endpoint is a key whose presence indicates to the client that it should establish a new connection (via the protocol) to receive the content. The format for the endpoint may be: [IP_address]-[UDP_port_number]-[destination_port_number].

In a variant embodiment, the UDP delivery may be multicast UDP. In this variant, the client makes an HTTP request to the server, and the HTTP server responds with a response containing an empty body, as previously described. The HTTP response also contains the transport header for the hybrid protocol, and in this case the header includes a multicast group address. The client then joins the multicast group and receives the requested content. Joining the multicast group and receiving the multicast UDP packets can be facilitated (as an option) by Automatic Multicast Tunneling (AMT) for clients in networks where native IP multicast is not supported. Once the content is received, the client can leave the multicast group. Any number of requests for the same file (which could be a segment of a stream) by many clients can be satisfied via the same multicast group. To make this possible, the server sends the data of the file to the multicast group. Preferably, the data is sent FEC-encoded. Thus for example, if the file is 1 MB in size, the server keeps sending FEC packets containing information about the file's data (useful for decoding of the file by clients) for some preconfigured amount of time at a preconfigured rate. For example, the server might send the 1 MB file at 8 Mbps (i.e.

1 MB per second) for some defined time period. Within that time period all clients who request the same file all use the same multicast group. This approach saves resources and can support delivery of popular content (live streams or software updates) to many receivers while sending a single copy of it over multicast. The duration for which the file is being sent to the multicast group can be dynamically extended based on demand for the file by clients; i.e., as long as there are requests for the file, the server keeps sending it to the multicast channel. Clients can join the multicast group at any time and, due to the FEC encoding, they only need to join for as long as necessary to receive sufficient data to decode the original file. As an optimization, servers may send the same file's content on multiple multicast groups in parallel and clients may join multiple of them (all would be returned in the original HTTP response's header) to better utilize their download capacity and to receive the files faster (as FEC allows combining data from multiple sources easily).

As can be seen, the approach works by a client (configured to use the hybrid HTTP-UDP protocol) making an HTTP request to a server (configured to use the protocol), which then returns over UDP the media or file content as a response to the HTTP request. This approach enables a provider to use or leverage standard CDN infrastructure available for HTTP including access control, authentication, QoS reporting, GEO-location and other features built into an HTTP-based webserver, while providing complete control of the media or file data transmission on top of UDP. The latter includes, without limitation, custom congestion control approaches and/or encoding of the packets such as forward error correction (as described above) to provide better experience and control even when networking characteristics (such as packet loss and latency) are not optimal. In such case, the approach thus combines the benefits of using existing features of HTTP from traditional downloads and streaming solutions with the benefits of UDP-based transmission of data. The hybrid approach is very advantageous because it uses existing HTTP-based solutions for controlling what is going to be transmitted but at the same time benefits from using UDP-based data transmission for the media or other content. In cases where UDP communication is not possible, standard HTTP is used for both request and response to ensure every client can receive the data. The support for UDP is communicated via HTTP.

An application and server can use the approach directly or a proxy could be used to add support for this functionality. For example, a streaming application or a browser (for downloads) can make a request to or through a proxy over HTTP only and the proxy then uses this approach when communicating with a server. Preferably, client-to-proxy communication is HTTP-only while the proxy communicates with the server over hybrid HTTP and UDP-based protocol. Similarly, a web server can use a proxy (either transparently or explicitly) to add support for this approach.

For streaming, there is an added benefit in that the approach works well with any existing HTTP-based streaming technologies.

More generally, the approach described herein may be implemented whenever HTTP streaming from server to client is required. A client refers to the side receiving the video stream and playing it back to a screen. Clients may be running on a desktop computer, mobile device (smart phones, tablets, etc.), set-top boxes, smart televisions, or any other connected devices. The server is the side sending out the stream data to the client. As referenced herein, HTTP-based streaming refers to any video streaming which uses only HTTP protocol to request and download objects to construct the stream for playback. Non-limiting examples include Apple HLS, Adobe HDS, Microsoft SmoothStreaming, and MPEG-DASH. The approach herein may be used to support live and on-demand streaming, e.g., an MPEG-2 transport stream containing a program stream made up of an H.264 video elementary stream, and an AAC audio elementary stream. This example is not intended to be limiting of course.

The HTTP/UDP hybrid delivery approach described herein improves video streaming quality. The approach can fit transparently into existing HTTP-based streaming solutions. The hybrid approach significantly reduces the negative impact of packet loss and latency for media data transfer, thereby significantly improving streaming quality.

The client part of the technology described herein may be implemented as a software development kit (SDK) for one or more platforms (e.g., iOS, Android, etc.), and the SDK may be used in applications on the platforms to enable compatible mobile apps to download/stream content using the hybrid HTTP/UDP approach. Thus, for example, an application either can use the SDK to download URL objects via its API or it may use a local HTTP server created by the SDK to stream/download from.

The hybrid protocol provides significant advantages, especially when coupled with other technologies such as FEC-based UDP delivery and advanced congestion control techniques. FEC is a well-known technique that overcomes packet loss by utilizing redundancy. In FEC, instead of sending an original flow of packets (where each packet represents a piece of the data), the sender encodes the data into a new set of packets (where each packet holds information about various parts of original data with additional parity data). The new set is generally larger in size compared to the original data. The receiver of the encoded data performs decoding and, once it receives enough coded packets, reconstructs the original data. To reconstruct the data usually only the same amount of encoded data as the original data size needs to be received, or slightly more. This allows for the transfer to be lossy while still being able to decode the original data without any need for retransmission of the data. There are various FEC codes that are suitable for different loss rates and applications. IETF Reliable Multicast Working Group has specified three FEC schemes to be used for delivering content reliably, namely, RaptorQ (as described in RFC 6330), Low-density parity-check (LDPC) (as described in RFC 5170), and Reed-Solomon (as described in RFC 5510). Other known FEC techniques include Raptor R10 (as described in RFC 5053), which is an older version of RaptorQ. Congestion control schemes, such as Akamai® FastTCP™, may be adapted for use to facilitate custom congestion control for the data packets that are sent from the server to the client. Generally, this known scheme uses queuing delay to measure network congestion. At the sender, congestion window (CWND) is used to control the number of bytes to send. Initially, and according to the scheme, CWND is increased quickly to match up the transmission delay, then adjusted less aggressively to match up the variation of queuing delay (as packets are queued along the path). The sender adjusts its CWND to adapt to network changes.

The technique described herein provides for increase in total throughput under random environmental (non-congestive) loss and high latency, compared to standard TCP or multiple parallel TCP connections. The technique also provides for increase in stability of throughput via more accurate bandwidth estimation and advanced congestion detection. Further, the technique provides for reduction in start-up times, reduction in rebuffering events of quantity and duration, and reduction in frequency of bitrate switching. All of the above lead to longer viewing times and better user experience. The described technique also provides for smooth fail-back mode using standard HTTP approach for streaming.

As a variant, the UDP-based portion of the delivery may be carried out via multipath. In general, multipath refers to downloading from multiple sources (e.g., multiple edge servers, end user peers, or the like) in parallel. Multipath also refers to the scenario wherein the same server (or peer) is used for downloading multiple times in parallel over different paths in the network. Such schemes may be useful when FEC coding is implemented, as FEC allows for combining data from many sources without any reconciliation. In certain circumstances, downloading from multiple sources in parallel (and even dynamically changing those sources depending on their performance) may be implemented during with respect to the UDP phase.

In a representative implementation, the subject functionality is implemented in software, as computer program instructions executed by a processor.

More generally, the techniques described herein are provided using a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTP, such as HTTPS, or any other protocol having similar operating characteristics.

Generalizing, there is no limitation on the type of computing entity that may implement the client-side or server-side of the connection. Any computing entity (system, machine, device, program, process, utility, or the like) may act as the client or the server.

What is claimed is as follows:

1. A method of data delivery, comprising:
at a server executing on a hardware platform:
receiving, from a client and over an HTTP over TCP connection, an HTTP request that identifies a content object;
returning to the client over the HTTP over TCP connection a response to the HTTP request that includes at least a header and a response body, the header including an IP address and UDP port number associated with the server, the response body being devoid of the content object requested;
receiving from the client over a UDP connection a UDP request directed to the IP address and UDP port number; and
upon a successful verification of the UDP request, returning a response to the UDP request over the UDP connection and that includes the content object that was identified in the HTTP request but not returned in the response body, wherein:
the HTTP over TCP connection is kept-alive after satisfying the HTTP request;
the UDP connection is kept-alive after satisfying the UDP request;
keeping alive the HTTP over TCP connection and the UDP connection enables connection re-use for one or more additional HTTP requests for additional byte ranges of content that includes the content object, with the additional byte ranges being delivered over the UDP connection; and
the delivery over the UDP connection being in accordance with a UDP delivery preference.

2. The method as described in claim 1 wherein the HTTP request comprises an HTTP request header that includes an indication that the client desires to use a UDP connection for transfer of a body of the response to the HTTP request, together with the UDP delivery preference.

3. The method as described in claim 1 wherein the HTTP request header also includes information to prevent one or more proxies between the server and the client from caching the response to the HTTP request.

4. The method as described in claim 1 wherein the content object is returned to the client according to a forward error correction (FEC) coding scheme.

5. The method as described in claim 1 wherein the content object and the additional byte ranges of content comprise one of: fragments of a video, a software download, and other media content.

6. The method as described in claim 1 wherein the server is further configured to drop any unexpected packet received from the client without providing any response.

7. The method as described in claim 1 wherein the response to the UDP request includes a multicast group address at which the client can obtain the content object.

8. The method as described in claim 1:
wherein the header also includes a security token, and wherein successful verification of the UDP request also verifies that the UDP request includes the security token; and
wherein the UDP request includes a sequence number, and wherein the response to the UDP request includes the sequence number.

9. An apparatus, comprising:
a hardware processor; and
computer memory holding computer program code executing in the hardware processor, the computer program code configured to:
receiving, from a client and over an HTTP over TCP connection, an HTTP request that identifies a content object;
returning to the client over the HTTP over TCP connection a response to the HTTP request that includes a header and a response body, the header including at least an IP address and UDP port number associated with the server, the response body being devoid of the content object requested;
receiving from the client over a UDP connection a UDP request directed to the IP address and UDP port number; and
upon a successful verification of the UDP request, returning a response to the UDP request over the UDP connection and that includes the content object that was identified in the HTTP request but not returned in the response body, wherein:
the HTTP over TCP connection is kept-alive after satisfying the HTTP request;
the UDP connection is kept-alive after satisfying the UDP request;
keeping alive the HTTP over TCP connection and the UDP connection enables connection re-use for one or more additional HTTP requests for additional byte ranges of content that includes the content object, with the additional byte ranges being delivered over the UDP connection; and
the delivery over the UDP connection being in accordance with a UDP delivery preference.

10. The apparatus as described in claim 9 wherein the HTTP request comprises an HTTP request header that includes an indication that the client desires to use a UDP connection for transfer of a body of the response to the HTTP request, together with the UDP delivery preference.

11. The apparatus as described in claim 9 wherein the HTTP request header also includes information to prevent one or more downstream proxies from caching the response to the HTTP request.

12. The apparatus as described in claim 9 wherein the content object is returned to the client according to a forward error correction (FEC) coding scheme.

13. The apparatus as described in claim 9 wherein the content object and the additional byte ranges of content comprise one of: fragments of a video, a software download, and other media content.

14. The apparatus as described in claim 9 wherein computer program code is further configured to drop any unexpected packet received from the client without providing any response.

15. The apparatus as described in claim 9 wherein the response to the UDP request includes a multicast group address at which the client can obtain the content object.

16. The apparatus as described in claim 9:
wherein the header also includes a security token, and wherein successful verification of the UDP request also verifies that the UDP request includes the security token; and
wherein the UDP request includes a sequence number, and wherein the response to the UDP request includes the sequence number.

\* \* \* \* \*